United States Patent [19]

Ross et al.

[11] Patent Number: 5,738,298
[45] Date of Patent: Apr. 14, 1998

[54] TIP FENCE FOR REDUCTION OF LIFT-GENERATED AIRFRAME NOISE

[75] Inventors: James C. Ross, Oakland; Bruce L. Storms, Moutain View, both of Calif.

[73] Assignee: The United States of America as represented by the Administrator of the National Aeronautics and Space Administration, Washington, D.C.

[21] Appl. No.: 482,459

[22] Filed: Jun. 8, 1995

[51] Int. Cl.$^6$ .................................. B64C 3/58; B64C 9/00
[52] U.S. Cl. ........................ 244/1 N; 244/91; 244/199; 244/213
[58] Field of Search .......................... 244/1 N, 91, 199, 244/213, 214, 215, 218, 219

[56] References Cited

U.S. PATENT DOCUMENTS

| | | | |
|---|---|---|---|
| 2,260,952 | 10/1941 | Novack | 244/91 |
| 2,368,205 | 1/1945 | Diehl | 244/91 |
| 4,017,041 | 4/1977 | Nelson | 244/40 R |
| 4,032,087 | 6/1977 | Cleaves | 244/214 |
| 4,036,452 | 7/1977 | Schairer | 244/1 N |
| 4,471,925 | 9/1984 | Kunz | 244/215 |
| 4,714,215 | 12/1987 | Jupp et al. | 244/91 |
| 5,050,822 | 9/1991 | Whitehouse | 244/215 |
| 5,069,402 | 12/1991 | Wortman | 244/199 |
| 5,348,256 | 9/1994 | Parikh | 244/209 |
| 5,435,502 | 7/1995 | Wernicke | 244/199 |
| 5,518,210 | 5/1996 | Friberg | 244/215 |

OTHER PUBLICATIONS

"Measurements of Noise Produced by Flow Past Lifting Surfaces", J.M. Kendall, Jet Propulsion Laboratory, AIAA 16th Aerospace Sciences Meeting, pp. 1-10, 1978.

Primary Examiner—Virna Lissi Mojica
Attorney, Agent, or Firm—Kenneth L. Warsh; Harry Lupuloff; John G. Mannix

[57] ABSTRACT

The present invention is directed toward a unique lift-generated noise reduction apparatus. This apparatus includes a plurality of tip fences that are secured to the trailing and leading assemblies of the high-lift system, as close as possible to the discontinuities where the vortices are most likely to form. In one embodiment, these tip fences are secured to some or all of the outboard and inboard tips of the wing slats and flaps. The tip fence includes a generally flat, or an aerodynamically shaped plate or device that could be formed of almost any rigid material, such as metal, wood, plastic, fiber glass, aluminum, etc. In a preferred embodiment, the tip fences extend below and perpendicularly to flaps and the slats to which they are attached, such that these tip fences are aligned with the nominal free stream velocity of the aircraft.

In addition to reducing airframe noise, the tip fence tends to decrease drag and to increase lift, thus improving the overall aerodynamic performance of the aircraft. Another advantage presented by the tip fence lies in the simplicity of its design, its elegance, and its ready ability to fit on the wing components, such as the flaps and the slats. Furthermore, it does not require non-standard materials or fabrication techniques, and it can be readily, easily and inexpensively retrofited on most of the existing aircraft, with minimal design changes.

16 Claims, 5 Drawing Sheets

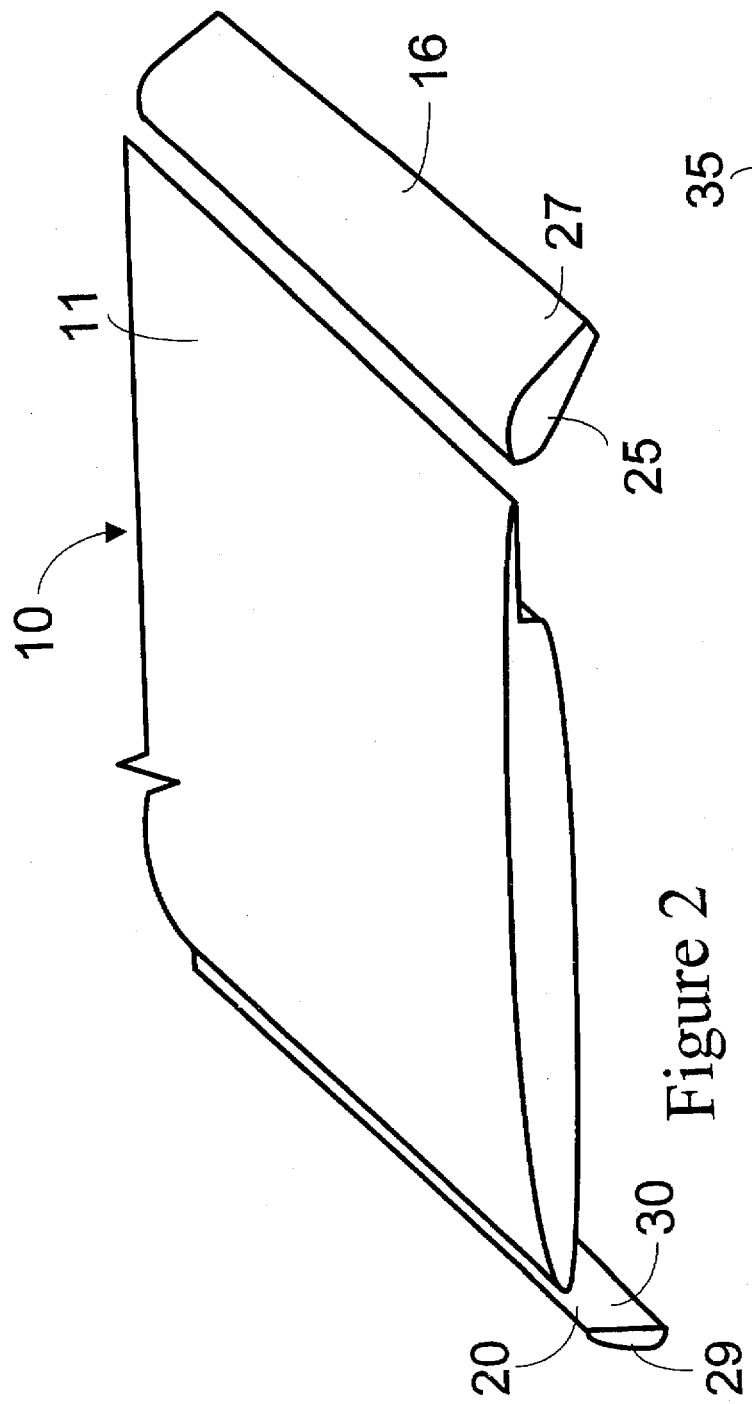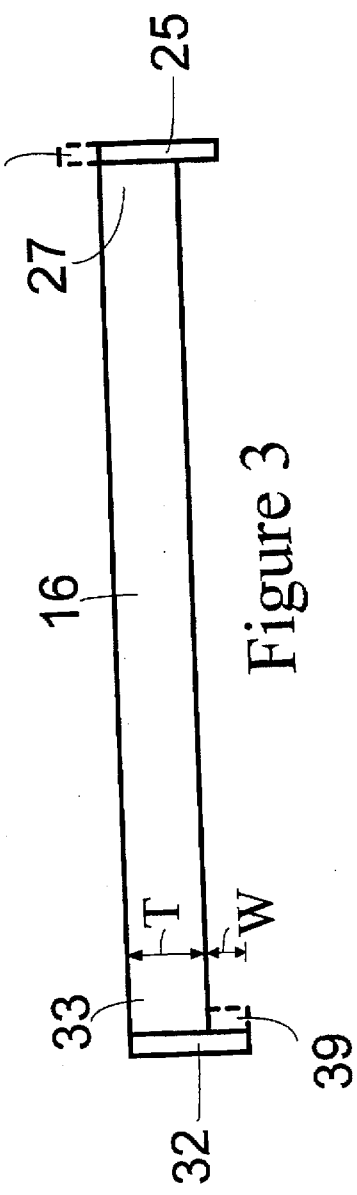

TIP FENCE FOR REDUCTION OF LIFT-GENERATED AIRFRAME NOISE

ORIGIN OF INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

The present invention is generally directed to noise suppression in an aircraft. It more particularly relates to a tip fence for the reduction of airframe aerodynamic noise generated at the inboard and outboard tips of high lift systems, such as trailing edge flaps and leading edge slats.

2. Description of the Prior Art

Ever since the advent of engine powered aviation a number of solutions directed to diminishing the noise produced by airframes have been proposed. It has been suggested that by diminishing tip vortices, noise is reduced. In this regard, attention is directed to U.S. Pat. No. 4,017,041, issued to Nelson, for "Airfoil Tip Vortex Control."

The Nelson patent describes a device for diminishing tip vortices in an aircraft by means of retractable foils mounted on the wings, and projecting upwardly and/or downwardly therefrom. The preferred operation of the retractable foils would be to angle the foils slightly relative to the centerline of the aircraft. These retractable foils allegedly improve the rate of climb of an aircraft at a given engine setting and diminish the area over which the major amounts of noise generated by the aircraft will be dispersed. The foils may be fully retractable into the aircraft wing, but if not fully retracted, they will each provide a small streamlined ridge projecting upwardly and/or downwardly adjacent the tip of the aircraft wings which, allegedly improve the lift characteristics of the wings by diminishing air flow around the end of the wings sufficiently to compensate for the drag otherwise created. The patent briefly mentions, without much explanation that the foils may also be advantageously applicable to other aircraft components, such as flaps, stabilizers or elevators.

The major problems with devices of the type disclosed in the Nelson patent is that while foils provide a mechanical system for manipulating tip vortices, they do so in a manner that unduly disturbs the air flow. Thus, additional problems result from the use of the foils disclosed in this patent. When the foils are deployed, the size of these foils, and the ridges between them constitute an additional source of noise, and tend to increase drag as well as noise.

The foils add mechanical complexity to the aircraft design, particularly since they require added hydraulic systems, electrical motors and wiring. Further, the limited space within the wing components, such as the flaps and the slats, would prevent the installation of several of these foils on a single wing. In particular, it would be extremely unrealistic to retrofit existing airplanes with such foils. The added design complexity and maintenance cost render these foils quite undesirable.

Various designs and tests that have been proposed for noise reduction in an aircraft, are exemplified by the following publications:

U.S. Pat. No. 5,050,822, issued to Whitehouse et al., for "Wing Flap Aerodynamic Noise Suppression," describes an arrangement for suppressing aerodynamic noise generated by cavity effect interaction between a wing flap shroud and one or more partially deployed trailing edge flaps. Noise suppression vanes are so positioned with respect to the shroud lower trailing edge and the leading edge of the wing flaps at partial deployment, that eddies and vortices resulting from airflow separation at the shroud lower surface are diverted sufficiently by the noise suppression vanes to avoid significant noise inducing impingement of the separated flow on the flap leading edge. This noise source is too small to make a difference.

U.S. Pat. No. 5,348,256, issued to Parikh, for "Supersonic Aircraft and Method," describes a supersonic aircraft having highly swept subsonic leading edge portions of the wings provided with boundary layer control suction slots. When the airplane is operating at high angles of attack under circumstances where noise is objectionable, air is drawn in through the suction strips to alleviate separated air flow and substantially eliminate (or at least alleviate) vortices that would otherwise develop over the upper wing surface. This improves the L/D ratio and permits the engines to be at a lower power setting, thus alleviating noise.

U.S. Pat. No. 4,036,452, issued to Schairer for "Retractable Engine Noise Suppression System for Over-the-Wing Jet Aircraft," describes a retractable multiple aperture arrays, mounted behind the jet engines that produce jet exhausts which pass chordwise over the wings of an aircraft. In an operative position, a multiple aperture array lies in the exhaust path of each engine, immediately rearwardly of the engine nacelle. In this position, the arrays split the exhausts into separate streams, which entrain ambient air. The entrained ambient air mixes with the separated streams in the region where the streams recombine to suppress engine exhaust noise and move the noise source centers of the engine exhausts to positions above the wings. As a result, the wings act to shield noise from the line-of-sight community located generally beneath the wings. When not in use, the multiple aperture arrays are each stowed in a compartment formed in the upper surface of the wing, beneath and immediately rearwardly of the engine with which the array is associated. Doors that close the entrance to these compartments may remain open when the multiple aperture arrays are in their operative positions to provide lateral noise shielding.

Article titled "Measurements of Noise Produced by Flow Past Lifting Surfaces", J. M. Kendall, Jet Propulsion Laboratory, AIAA 16th Aerospace Sciences Meeting, pp 1–10, 1978, describes wind tunnel studies, to determine the specific locations of aerodynamic noise production within the flow field about various lifting surface configurations. This article vaguely, and without specific explanation, mentions that end plates attached to the flap model affected the noise.

None of the devices or methods described in the above publications successfully redresses the problems raised by the Nelson patent, and reduces lift-generated airframe noise in a simple, elegant and inexpensive way.

Another proposed method for reducing airframe noise has been to make the flap tip out of a porous material for absorbing noise rather than allowing it to radiate. However, this method of acoustically treating the flap surfaces causes increased skin-friction drag thus reducing performance, and requires special non-standard materials and fabrication techniques. Additionally, porous surfaces have a tendency to absorb and store moisture and thus to corrode.

Therefore, there is a significant and still unfulfilled need for a new apparatus that reduces lift-generated airframe noise.

SUMMARY OF THE INVENTION

The present invention provides a unique tip fence for the reduction of airframe noise generated by high lift systems, such as flaps and slats, without affecting the magnitude of the vortices significantly. In addition to reducing airframe noise, the tip fence tends to decrease drag and to increase lift, thus improving the overall aerodynamic performance of the aircraft in its high-lift configuration.

Yet another advantage presented by the present tip fence lies in the simplicity of its design, its elegance, and its ready ability to fit on the wing components, such as the flaps and the slats. The present tip fence does not require non-standard materials or fabrication techniques, and can be readily, easily and inexpensively retrofited on most of the existing aircraft, with minimal design changes.

Briefly, the foregoing and other features of the present invention are achieved by providing a unique lift-generated noise reduction apparatus. This noise reduction apparatus includes a plurality of tip fences that are secured to the trailing and leading assemblies of the highlift system, as close as possible to the discontinuities where the vortices are most likely to form. In a preferred embodiment, these tip fences are secured to all the outboard and inboard tips of the wing slats and flaps.

The tip fence includes a generally flat, or an aerodynamically shaped plate or device that could be formed of almost any rigid material, such as metal, wood, plastic, fiber glass, aluminum, etc. The tip fences preferably extend below and perpendicularly to the flaps and the slats to which they are attached, such that these tip fences are aligned with the nominal free stream velocity of the aircraft.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 2 is a schematic, exploded, isometric view of part of the wing of FIG. 1, illustrating a tip fence mounted on one flap and one slat of the high-lift system;

FIG. 3 is a front view of either the flap or the slat shown in FIG. 2;

DETAILED DESCRIPTION OF THE INVENTION

Figure 1:
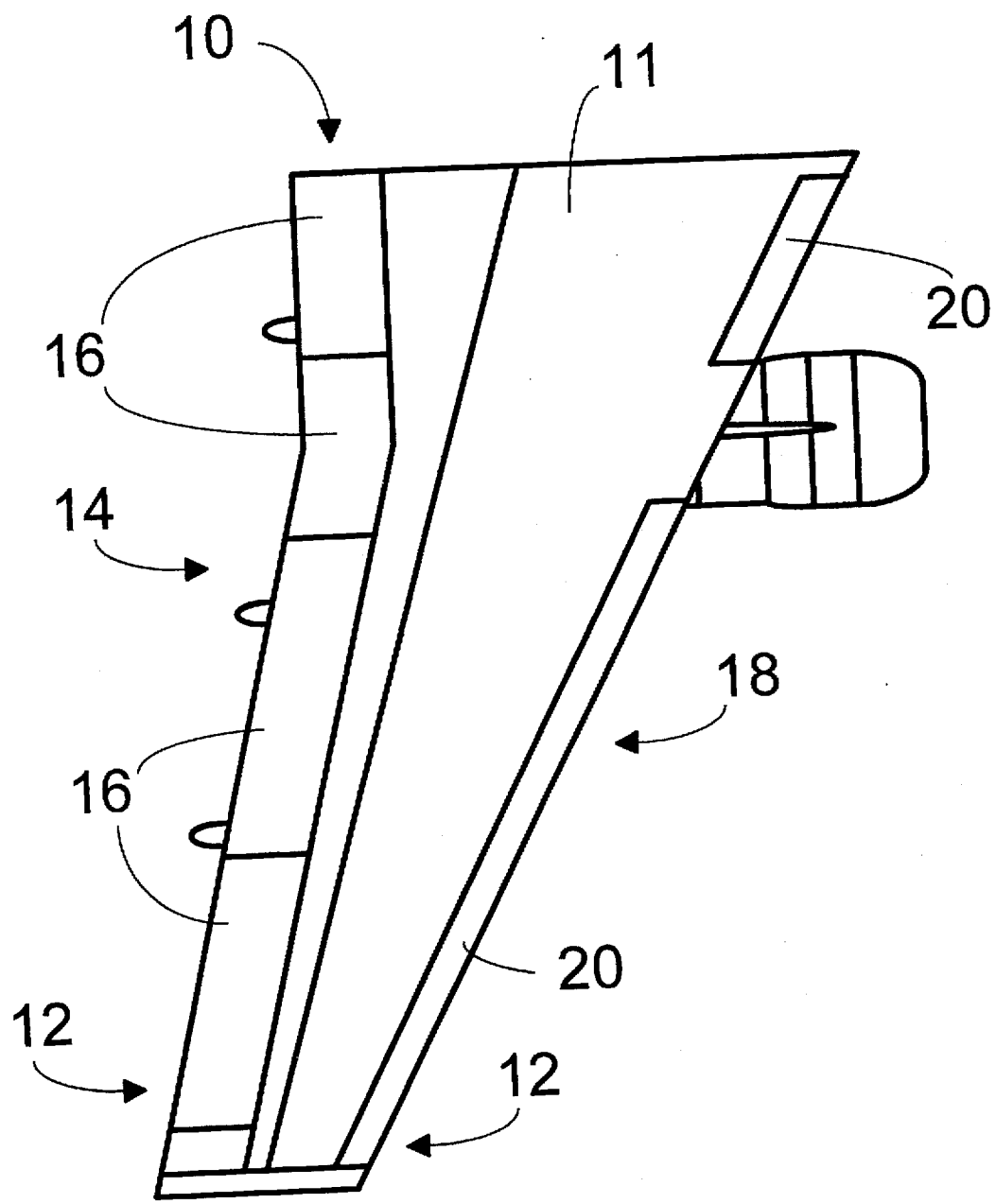
FIG. 1 is a top plan view of an aircraft wing showing a high-lift system, comprised of a plurality of flaps and slats, on which a plurality of tip fences are to be mounted according to the present invention.

FIG. 1 illustrates an aircraft wing 10 that includes a main element 11 and a high-lift system 12. In the present example, the high-lift system 12 comprises a plurality of movable components, such as a trailing assembly 14 formed of a plurality of adjacent flaps 16, and a leading assembly 18 formed of a plurality of slats 20.

A typical mode of operation during takeoff and landing of the aircraft would be as follows. During takeoff, the slats 20 of the leading assembly 18 are partially extended to provide a clean flow over the main element 11. Shortly after take-off, the slats 20 would be retracted to improve the lift-over-drag (L/D) ratio of the climbout configuration. The transition from the take-off configuration to the climbout configuration would be completed by the time the aircraft reaches an attitude of approximately 700 feet, at which community noise impact becomes an issue. The flaps 16 are partially extended for take-off and climbout. During landing, the slats 20 and the flaps 16 are fully extended, and if they are not provided with tip fences according to the present invention, significant aerodynamic noise would be generated at their tips.

With the foregoing being presented as background information, attention will now be directed to a more specific description of the first embodiment of the present invention with reference to FIGS. 2 and 3. FIG. 2 is an exploded isometric view of part of the wing 10 of FIG. 1 provided with a lift-generated noise reduction or suppression apparatus formed of a tip fence 25 mounted on an outboard tip 27 of a flap 16, and another tip fence 29 mounted on an outboard tip 30 of a slat 20. The tip fences 25, 29 may be secured to the flap 16 and slat 20, respectively, by any appropriate method. For instance, the tip fences may be riveted, welded, or bolted to the flap 16 and slat 20.

FIG. 3 is a front view of either the flap 16 or the slat 20 of FIG. 2. For simplicity of illustration, it will be presumed that FIG. 3 shows the flap 16, with the tip fence 25 secured to its outboard tip 27, and with another tip fence 32 secured to its inboard tip 33. Such placement of the tip fences, i.e., 25, 32, relative to a high-lift component, such as the flap 16, is repeated for all the remaining components of the high-lift system 12, such as the flaps and slats of the aircraft wings.

The tip fences 25 and 32 have substantially similar construction and composition, and therefore only the tip fence 25 will be described in greater detail. The tip fence 25 includes a generally flat, or an aerodynamically shaped plate that could be formed of almost any rigid material, including but not limited to metal, wood, plastic, fiber glass, aluminum, etc. The tip fence 25 is attached to the outboard tip 27 of the flap 16, and, in a preferred embodiment, extends below the surface of the flap 16, perpendicular to the lower surface outline. Preferably, the tip fence 25 is aligned with the nominal free stream velocity of the aircraft. The thickness, height and specific shape of the tip fence 25 may vary significantly and do not pose a substantial limitation to the inventive design.

While the tip fences of the present invention, and more particularly tip fence 25 has been described as extending below the surface of the flap 16 (or slat 20), it should be clearly understood to the persons of ordinary skill in the field that the tip fences may also extend above the surface of the flap 16, as shown in dashed lines by the protruding edge 35.

Figure 4:
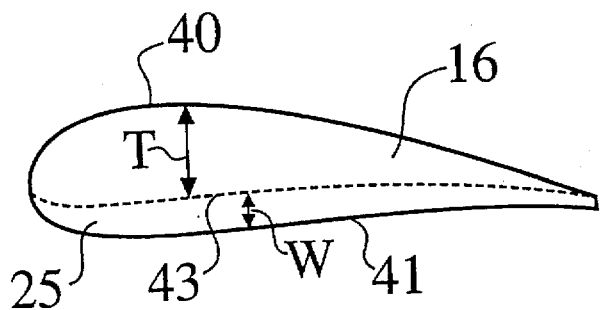
FIG. 4 is an enlarged side view of a first embodiment of the flap of FIG. 3, showing the flap tip in dashed lines.

A first embodiment of the tip fence 25 flap 16 is illustrated in FIG. 4, with the flap 16 shown in dashed lines. In the present example, the tip fence 25 is mounted on the outboard tip of the flap 16, and has its upper contour 40 substantially match, and positioned in registration with that of the flap 16. The lower contour 41 of the tip fence 25 is generally similar and parallel to the lower contour 43 of the flap 16. The tip fence 25 extends below the flap contour 43 by a predetermined width differential "W". This width differential "W" may vary with various considerations, for instance the type of high-lift system 12 to which the tip fences are applied. In the present illustration, the width differential "W" is about half the thickness "T" of the flap 16.

While FIG. 4 shows the tip fence 25 as having a generally similar aerodynamic shape as that of the flap 16, it should be clear that the inventive concept is not limited to such shape, and that the tip fence 25 may have different other shapes, such as a flat, thin generally rectangularly shaped plate. Alternative configurations of the tip fences according to the present invention, such as the tip fence 25, could include aerodynamic surfaces which force the flow separating from the flap tip lower surface to be deflected downward. Devices which alter the trajectory of the separating shear layer around the flap tip would also be alternative embodiments of the present tip fences. These devices would include shapes other than flat plates, and devices that are not perpendicular to the flap or slat.

The tip fence 25 is preferably positioned as close as possible to a discontinuity where the vortex is most likely to form. In the illustrated example, the tip fence 25 is illustrated as being mounted on the outboard tip 27. It should however be clear that the tip fence 25 can alternatively be secured underneath the flap 16, close to the outboard tip 27, as shown in dashed lines by the exemplary fence 39 in FIG. 3.

Figure 5:
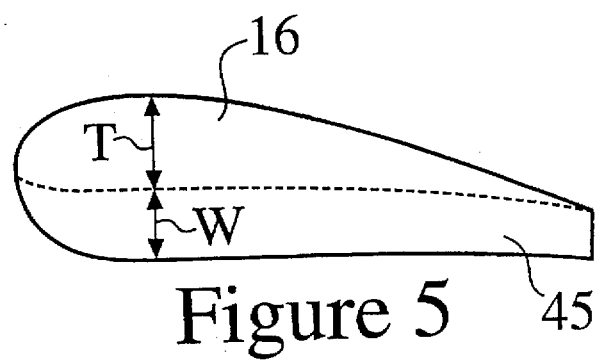
FIG. 5 is an enlarged side view of a second embodiment of the flap of FIG. 3, showing the flap tip in dashed lines.

A second tip fence 45 is shown in FIG. 5. This second embodiment is similar to the first tip fence 25 except that the width differential "W" is approximately equal to the thickness "T" of the flap 16. In one preferred embodiment, the differential width "W" does not exceed the thickness "T". It should however be clear that the differential width "W" can exceed the thickness "T".

Figure 6:
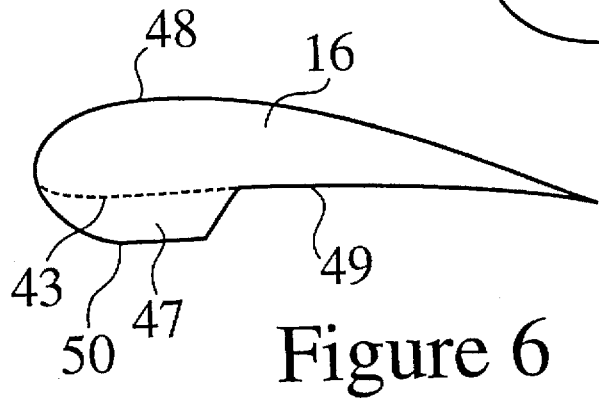
FIG. 6 is an enlarged side view of a third embodiment of the flap of FIG. 3, showing the flap tip in dashed lines.

FIG. 6 shows a third tip fence 47 made according to the present invention. In this particular example, the tip fence 47 is mounted on the outboard tip of the flap 16, and has its upper contour 48 substantially match, and positioned in registration with that of the flap 16. The lower contour of the tip fence 47 is formed of two sections 49, 50. The first section 49 substantially matches, and is positioned in registration with part of the lower flap contour 43. The second section 50 is generally parallel to the remaining portion of the lower flap contour, and extends below the flap contour 43 by a predetermined distance.

Figure 7:
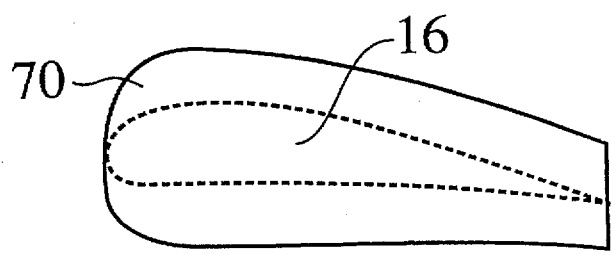
FIG. 7 is an enlarged side view of a fourth embodiment of the flap of FIG. 3, showing the flap tip in dashed lines.

FIG. 7 shows a fourth tip fence 70 mounted on the outboard or inboard tip of the flap 16. The tip fence 70 extends above the upper contour and below the lower contour of the flap 16.

Figure 8:
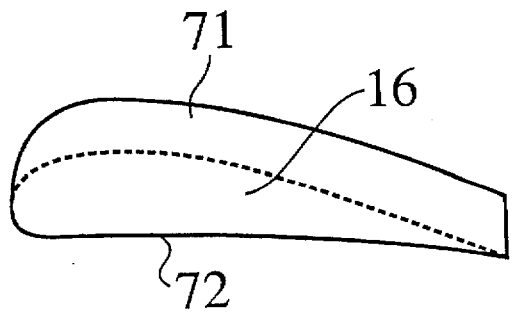
FIG. 8 is an enlarged side view of a fifth embodiment of the flap of FIG. 3, showing the flap tip in dashed lines.

FIG. 8 shows a fifth tip fence 71 mounted on the outboard or inboard tip of the flap 16. The tip fence 71 extends above the upper contour of the flap 16, and has its lower contour 72 substantially match, and positioned in registration with that of the flap 16.

Figure 9:
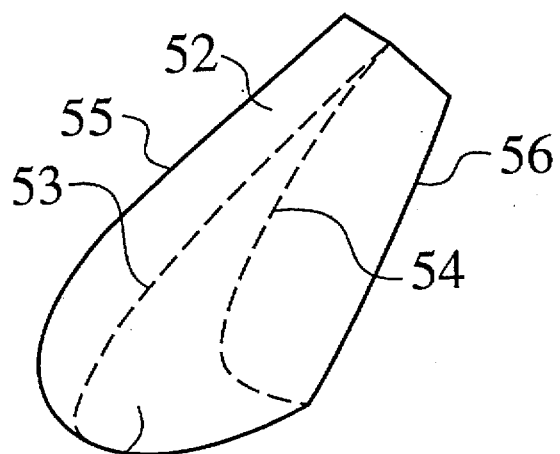
FIG. 9 is an enlarged side view of a first embodiment of the slat of FIG. 3, showing the slat tip in dashed lines.

FIG. 9 is an enlarged side view of a tip fence 52, according to a first embodiment of the present invention, that is secured to the outboard tip of the slat 20. The tip fence 52 is generally similar in design, shape and function to the tip fence 25. It extends above the upper contour 53 of the slat 20, as well as below its lower contour 54, in a general perpendicular relation relative to the slat 20. Preferably, the tip fence 52 is aligned with the nominal free stream velocity of the aircraft. The thickness, height and specific shape of the tip fence 52 may vary significantly and do not pose a substantial limitation to the inventive design.

In the present example, the upper contour 55 of the tip fence 52 is curved and is generally similar and parallel to the upper contour 53 of the slat 20. The lower contour 56 of the tip fence 52 is generally flat. It should however be clear that the overall contour of the tip fence 52 may be changed without departing from the scope of the present invention.

Figure 10:
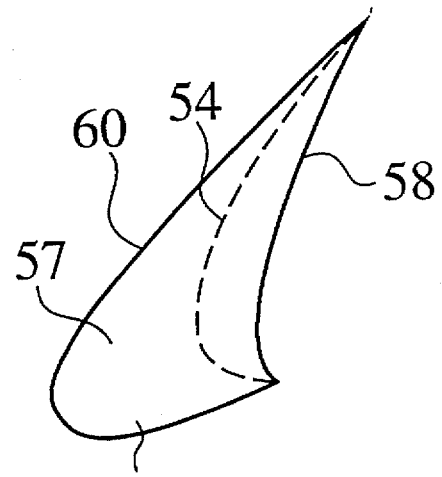
FIG. 10 is an enlarged side view of a second embodiment of the slat of FIG. 3, showing the slat tip in dashed lines.

For example, FIG. 10 shows a tip fence 57 according to another embodiment of the present invention shown secured to the outboard tip of the slat 20. The lower contour 58 of the tip fence 57 is curved, and extends below the lower contour 54 of the slat. The upper contour 60 of the tip fence 57 is curved, and is generally similar to, matches, and is positioned in registration with the upper contour 53 of the slat 20. Other shapes of the tip fence 20 are also contemplated by the present invention.

Figure 11:
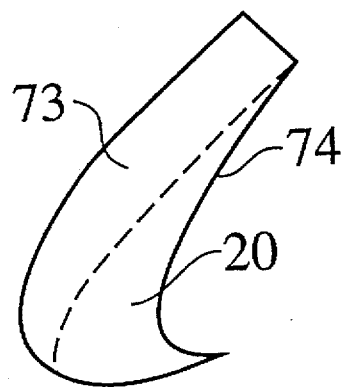
FIG. 11 is an enlarged side view of a third embodiment of the slat of FIG. 3, showing the slat tip in dashed lines.

FIG. 11 illustrates another tip fence 73 secured to the outboard or inboard tip of the slat 20. The tip fence 73 extends above the upper contour of the slat 20, and has its lower contour 74 substantially match, and positioned in registration with that of the slat 20.

Figure 12:
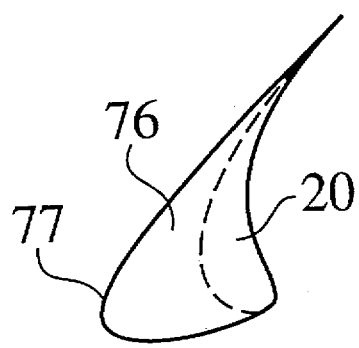
FIG. 12 is an enlarged side view of a fourth embodiment of the slat of FIG. 3, showing the slat tip in dashed lines.

FIG. 12 illustrates another tip fence 76 secured to the outboard or inboard tip of the slat 20. The tip fence 76 extends below the lower contour of the slat 20, and has its upper contour 77 substantially match, and positioned in registration with that of the slat 20.

Figure 13:
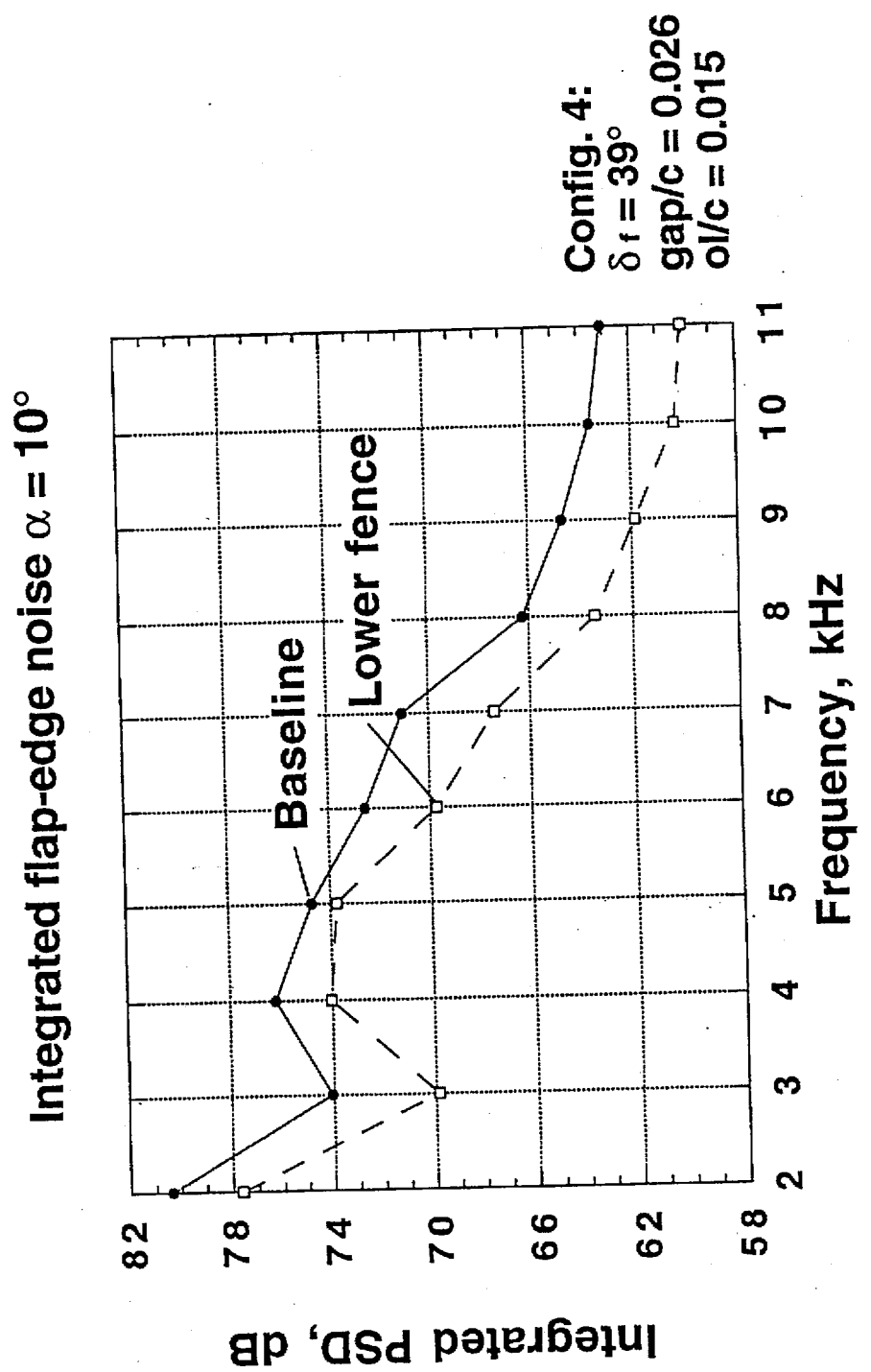
FIG. 13 is a chart prepared from empirical data taken of integrated power spectral density (PSD) in dB plotted against frequency in kHz.

Experimental tests were performed at the 7 by 10 Foot Wind Tunnel at NASA Ames Research Center, and an analysis of the performance of the wing 10 incorporating the present invention was made relative to the tip fence configuration illustrated in FIG. 4. This analysis is summarily shown in FIG. 13, and indicates that when integrated power spectral density measured in dB is plotted against frequency measured in kHz, tip-generated noise of the flap 16 is reduced significantly across a wide range of frequencies. The graph illustrated in a solid line reflects noise measurements for a baseline configuration of the flap 16 without the tip fence 25. The graph illustrated in dashed lines reflects noise measurements for the configuration of FIG. 4, referred to in FIG. 13 as the "Lower Fence." It has also been experimentally determined that, in general, the present invention can reduce the profile or viscous drag by approximately twenty percent.

While specific embodiments of the tip fences have been illustrated and described in accordance with the present invention, modifications and changes of the apparatus, parameters, and composition, use and operation will become apparent to those skilled in the art, without departing from the scope of the invention.

What is claimed is:

1. An aircraft wing comprising in combination:
   a high-lift system formed of a plurality of flaps, at least some of which having an outboard tip and an inboard tip; and
   a lift-generated noise reduction tip fence secured to at least one of said outboard tip and inboard tip of at least one of said flaps, and said tip fence moving with said at least one of said flaps, for reducing airframe aerodynamic noise generated at said one of said outboard tip and inboard tip.

2. The wing according to claim 1 wherein said tip fence includes a substantially rigid, flat plate.

3. The wing according to claim 2 wherein said tip fence may be made of any one of metal, wood, plastic, fiber glass, or aluminum.

4. The wing according to claim 1 wherein at least one of said plurality of flaps includes a lower contour; and wherein at least part of said tip fence extends below said lower contour of said flap to which it is secured.

5. The wing according to claim 4 wherein said tip fence is generally perpendicular to said flap to which it is secured.

6. The wing according to claim 1 wherein at least one of said plurality of flaps includes an upper contour;

wherein each tip fence includes an upper and a lower contour; and wherein said tip fence has its upper contour substantially match, and positioned in registration with said upper contour of said flap to which it is secured.

7. The wing according to claim 1 wherein at least one of said plurality of flaps includes an upper contour;

wherein each tip fence includes an upper contour which substantially matches, and which is positioned in registration with said upper contour of said flap to which it is secured; and wherein each tip fence includes a lower contour formed of a first section which substantially matches and which is positioned in registration with a part of said lower flap contour, and a second section which extends below another part of said lower flap contour.

8. An aircraft wing comprising in combination:

a high-lift system formed of a plurality of slats, at least some of which having an outboard tip and an inboard tip; and a lift-generated noise reduction tip fence secured to at least one of said outboard tip and inboard tip of at least one of said slats, and said tip fence moving with said at least one of said slats, for reducing airframe aerodynamic noise generated at said one of said outboard tip and inboard tip.

9. The wing according to claim 8 wherein said tip fence includes a substantially rigid, flat plate.

10. The wing according to claim 9 wherein said tip fence may be made of any one of metal, wood, plastic, fiber glass, or aluminum.

11. The wing according to claim 8 wherein at least one of said plurality of slats includes a lower contour; and wherein at least part of said tip fence extends below said lower contour of said slat to which it is secured.

12. The wing according to claim 11 wherein at least one of said plurality of slats includes an upper contour; and wherein at least part of said tip fence extends above said upper contour of said slat to which it is secured.

13. The wing according to claim 8 wherein said tip fence is generally perpendicular to said slat to which it is secured.

14. The wing according to claim 8 wherein at least one of said plurality of slats includes an upper contour;

wherein each tip fence includes an upper and a lower contour; and wherein said tip fence has its upper contour substantially match, and positioned in registration with said upper contour of said slat to which it is secured.

15. The wing according to claim 8 wherein at least one of said plurality of slats includes an upper contour;

wherein each tip fence includes an upper contour which substantially matches, and which is positioned in registration with said upper contour of said slat to which it is secured; and wherein each tip fence includes a lower contour formed of a first section which substantially matches and which is positioned in registration with a part of said lower slat contour, and a second section which extends below another part of said lower slat contour.

16. The wing according to claim 4 wherein at least one of said plurality of flaps includes an upper contour; and wherein at least part of said tip fence extends above said upper contour of said flap to which it is secured.

* * * * *